US006636328B1

(12) United States Patent
Pan et al.

(10) Patent No.: US 6,636,328 B1
(45) Date of Patent: Oct. 21, 2003

(54) FLEXIBLE ARRAY IMAGE DATA PROCESSING FOR INK JET NOZZLE DATA CONTROL IN DIGITAL IMAGE PRINTING SYSTEMS

(75) Inventors: Danjie Pan, Costa Mesa, CA (US); Chong-Hing Cheung, Mission Viejo, CA (US)

(73) Assignee: Viewahead Technology, Redmond, WA (US)

( * ) Notice: Subject to any disclaimer, the term of this patent is extended or adjusted under 35 U.S.C. 154(b) by 0 days.

(21) Appl. No.: 09/283,876

(22) Filed: Apr. 1, 1999

(51) Int. Cl.[7] .......................... G06F 15/00; B41J 2/195; B41J 29/393; B41J 2/14
(52) U.S. Cl. .................... 358/1.15; 358/1.16; 358/1.18; 347/7; 347/19; 347/47
(58) Field of Search .............................. 358/1.15–1.18; 347/47, 7, 19; 382/5

(56) References Cited

U.S. PATENT DOCUMENTS

| | | | | |
|---|---|---|---|---|
| 5,184,147 A | * | 2/1993 | MacLane et al. | 346/1.1 |
| 5,850,237 A | * | 12/1998 | Slade | 347/23 |
| 5,929,875 A | * | 7/1999 | Su et al. | 347/19 |
| 6,042,279 A | * | 3/2000 | Ackley | 400/103 |
| 6,056,455 A | * | 5/2000 | Klaus | 400/176 |

* cited by examiner

Primary Examiner—Edward Coles
Assistant Examiner—Saeid Ebrahimi
(74) Attorney, Agent, or Firm—Christopher J. Rourk; Akin Gump Strauss Hauer & Feld, LLP

(57) ABSTRACT

A printer that uses a number of control state machines to reconfigure logic array circuitry to perform image data processing in preparation for printing. The logic array circuitry is programmable and adaptable to accommodate a wide variety of printer components characteristic to digital image printing systems. The logic array circuitry is reconfigured, depending on the particular printer in which the invention is implemented, by the control state machines as they receive control state machine conditions corresponding to the printer components characteristic to that specific digital image printer. For example, the physical, mechanical, and electrical characteristics of the printer constitute the printer component that modify the control state machine conditions which in turn govern the configuration of the logic array circuitry through the control state machines. Examples of printer components used to determine the control state machine conditions include, among other things, the number of ink jet printer nozzles, the ink jet nozzle separation, the firing order of the ink jet nozzles, and other characteristics of the digital image printer including electrical processing circuitry characteristics of the digital image printer. Selected portions of the logic array of the printer is used to perform a variety of image data processing functions including, among other things, nozzle data shifting, nozzle data masking, nozzle dot counting, nozzle data mapping, and nozzle columns separation. Certain of these functions are performed using serial image data processing.

20 Claims, 8 Drawing Sheets

FLEXIBLE ARRAY IMAGE DATA PROCESSING FOR INK JET NOZZLE DATA CONTROL IN DIGITAL IMAGE PRINTING SYSTEMS

INCORPORATION BY REFERENCE

The following applications are hereby incorporated herein by reference in their entirety and made part of the present application:

1) U.S. patent application Ser. No. 09/282,949, filed Apr. 1, 1999;
2) U.S. patent application Ser. No. 09/282,956, filed Apr. 1, 1999;
3) U.S. patent application Ser. No. 09/283,175, filed Apr. 1, 1999.

BACKGROUND

1. Technical Field

The present invention relates generally to digital image data processing; and, more particularly, it relates to digital image printing.

2. Description of Related Art

Conventional digital image printing systems, in that they commonly employ parallel image data processing to image data throughout the digital image printing system, inherently require a significant dedication of real estate within its integrated circuitry. For example, for a digital image printing system that can accommodate a wide variety of image data having varying data sizes. In addition, depending on the specific components, circuitry and hardware of the particular digital image printing system, different data management and processing is required for the various characteristics. For example, within ink jet digital image printing systems, these varying characteristics include, among other things, number of ink jet nozzles, the mechanical separation between the ink jet nozzles, the number of ink jet nozzles that are fired at any given time, and the firing order of the ink jet nozzles.

A particular difficulty arises when the dealing with digital image printing systems having varying numbers of print nozzles. There is a great difficulty in applying one image data processing system across multiple platforms of digital image printing systems. This difficulty arises, among other reasons, due to the varying number of nozzles within the various digital image printing systems that employ parallel image data processing, and the parallel image data processing commonly operates on a fixed number of the image data at a given time wherein the number of the data corresponds, at least in part, to the number of ink jet nozzles within the digital image printing system.

Similar difficulty arises when the image data processing is performed in a manner that is correspondent to other physical and mechanical characteristics of the digital image printing system, in that, the data processing is inherently non-scaleable across the various digital image printing system platforms. In short, when performing image data processing in an intrinsically parallel manner, different logic circuitry is required to deal with each digital image printing system having varying physical and mechanical characteristics such as different number of ink jet nozzles. To accommodate image data processing within each of the different digital image printing systems having different physical and mechanical characteristics, additional logic circuitry is required to provide image data processing for each of the various possible digital image printing systems. This large dedication of parallel processing circuitry, for each of the possible digital image printing systems in which the image processing circuitry may be installed, greatly increases the size, and therefore the cost, of an integrated circuit used to perform these image data processing functions.

The conventional solution is to dedicate independent parallel logic circuitry to perform image data processing within digital image printing systems having various number of ink jet nozzles. For example, to design a single integrated circuit capable of integration within conventional digital image printing systems that may possess ink jet print nozzles numbers of 56, 48, and 96, three independent parallel logic circuits are cast on a single integrated circuit die to accommodate the three alternatives of ink jet nozzles. Similarly, to design a single integrated circuit capable of integration within conventional digital image printing systems that may possess ink jet print nozzles numbers of 96, 104, 192, and 208, four independent parallel logic circuits are cast on a single integrated circuit die to accommodate the three alternatives of ink jet nozzles.

Conventional digital image printing systems commonly perform a number of functions, some of which are highly computationally intensive. The conventional manner of dedicating a fixed amount of parallel logic circuitry to perform each of the functions within the digital image printing system inherently leads to unused portions of logic circuitry on a potentially significant portion of an integrated circuit. In addition, the performance of certain functions within digital image printing system require significantly more logic circuitry, at certain times, for their respective functions than for other functions. This typically results in slowed overall image data processing within the digital image printing system.

Further limitations and disadvantages of conventional and traditional systems will become apparent to one of skill in the art through comparison of such systems with the present invention as set forth in the remainder of the present application with reference to the drawings.

SUMMARY OF THE INVENTION

Various aspects of the present invention can be found in a printer that prints digital image data. The printer uses a printer component that is a member a number of types of printer components indicative of the printer. Using printer component, the printer configures image processing logic using a processing circuit. The image processing logic is capable of supporting the various types of printer components. The processing circuit that only uses that portion of the image processing logic that corresponds to the printer component indicative of the printer.

In certain embodiments of the invention, the processing circuit selects the portion of the image processing logic. If desired, the selection of the portion of the image processing logic is done automatically. Also, this automatic selection can be performed based on the type of printer component selected.

In other embodiments of the invention, the processing circuit comprises a control state machine. If desired, the control state machine uses a control state condition that helps to determine which portion of the image processing logic is to be used to perform image data processing. The control state condition corresponds to the printer component selected from the printer components indicative of the printer. Examples of printer components used to determine the control state machine conditions include, among other things, the number of ink jet printer nozzles, the ink jet nozzle separation, the firing order of the ink jet nozzles, and other characteristics of the digital image printer including electrical processing circuitry characteristics of the digital image printer.

To assist in the configuration of the image processing logic, a bit ring register is employed. The bit ring register has a fixed number of bits. Examples of bit ring register array capable of performing the configuration of the image processing logic accompanied by the processing logic are a 4×52 bit ring register array and a dual 1×104 bit ring register array.

In certain embodiments of the invention, the printer is contained within a multi-functional peripheral. The multi-functional peripheral device is a peripheral device containing a plurality of internal devices wherein each of the devices operates either independently or cooperatively to process the plurality of image data. Alternatively, the printer is contained within a stand alone device performing primarily digital image printing. The stand alone device interfaces with additional peripheral devices, including a computing device, if desired.

Other aspects, advantages and novel features of the present invention will become apparent from the following detailed description of the invention when considered in conjunction with the accompanying drawings.

DETAILED DESCRIPTION OF DRAWINGS

Figure 1:
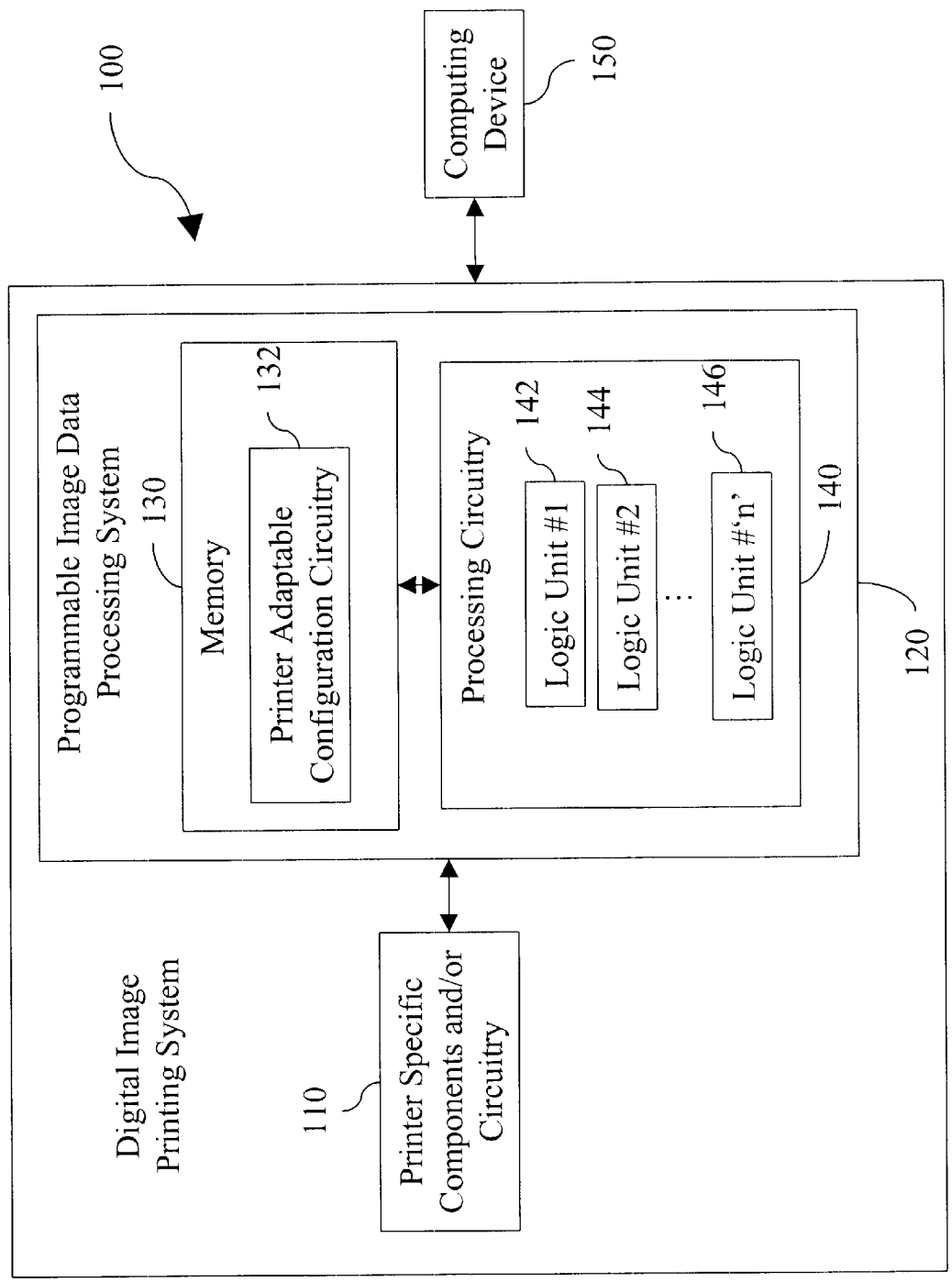
FIG. 1 is a digital image printer having programmable image data processing system illustrating one embodiment of the present invention.

FIG. 1 is a digital image printer 100 having programmable image data processing system 120 illustrating one embodiment of the present invention. The programmable image data processing system 120 contains a memory 130 and processing circuitry 140. The processing circuitry 140 contains multiple logic units, i.e., logic unit #1 142, logic unit #2 144, and logic unit #'n' 146. The memory 130 contains printer adaptable configuration circuitry 132. The entirety of the programmable image data processing system 120 interfaces with a digital image printer housing having printer specific components and/or circuitry 110. The digital image printer housing contains the programmable image data processing system 120 in one embodiment of the invention. The digital image printer 100 interfaces with a computing device 150. The interfacing between the digital image printer 100 and the computing device 150 is performed using any means known in the art for communicatively coupling, transmitting and receiving digital image data. In certain embodiments of the invention, the computing device 150 communicates with the digital image printer 100 via a communication link thereby permitting the provision of image data from a wide variety of sources.

Figure 2:
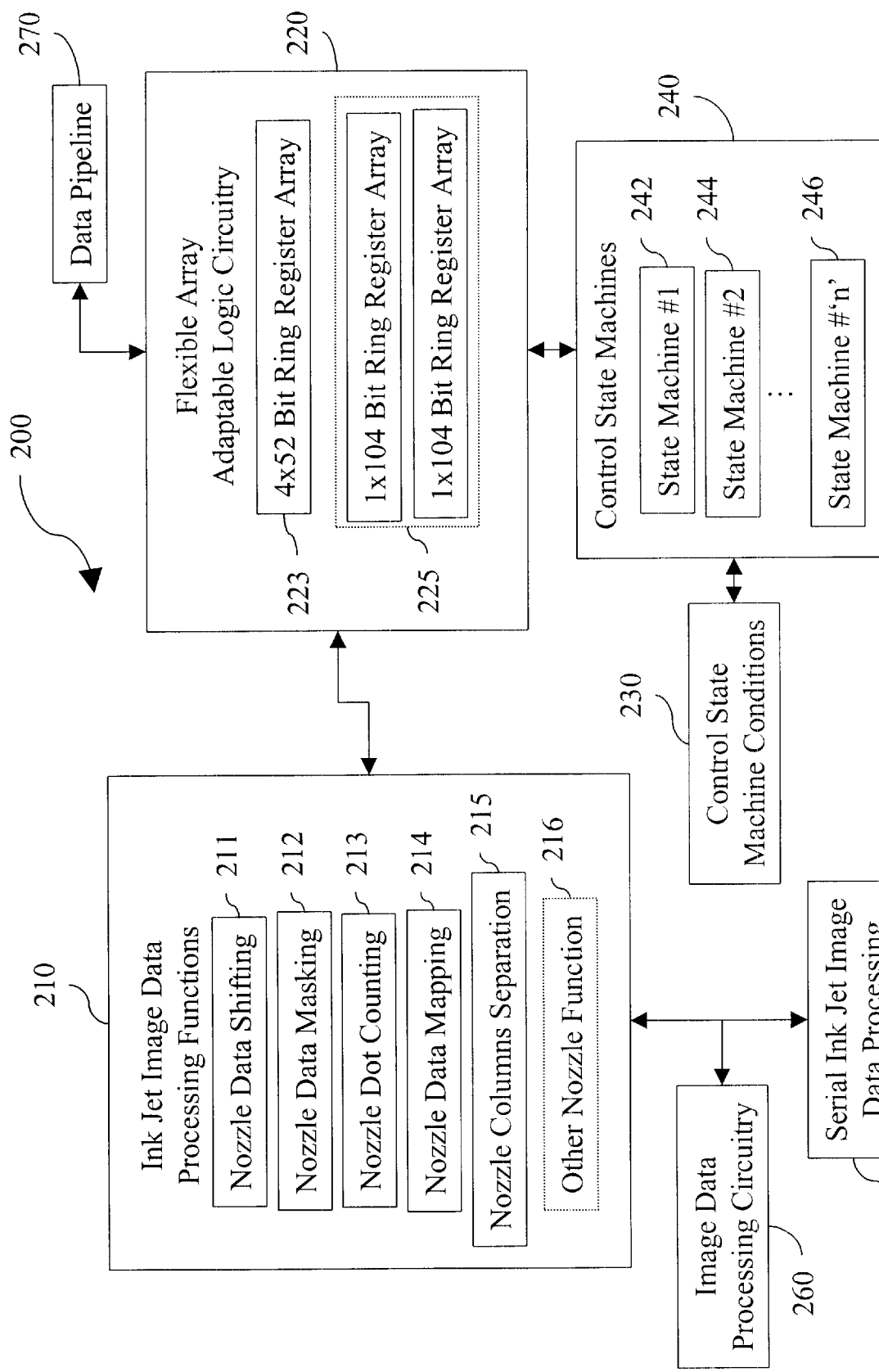
FIG. 2 is a digital image printer having flexible array adaptable logic circuitry illustrating one specific embodiment of the digital image printer of FIG. 1.

FIG. 2 is a digital image printer 200 having the flexible array adaptable logic circuitry 220 illustrating one specific embodiment of the digital image printer of FIG. 1. The digital image printer 200 performs a variety of ink jet image data processing functions 210. The ink jet image data processing functions 210 are performed using the flexible array adaptable logic circuitry 220, in that, a plurality of control state machines 240 reconfigure the flexible array adaptable logic circuitry 220 depending on which of the ink jet image data processing functions 210 is to be performed. The plurality of control state machines 240 receive control state machine conditions 230 that determine the particular configuration required for the plurality of control state machines 240 to reconfigure the flexible array adaptable logic circuitry 220. The plurality of control state machines 240 contains several state machines, namely, a state machine #1 242, a state machine #2 244, and a state machine #'n' 246. Any one of the plurality of control state machines 240 dominates and controls the entirety of the configuration of the flexible array adaptable logic circuitry 220 in one embodiment of the invention. Alternatively, several of the plurality of control state machines 240 operate cooperatively to configure the flexible array adaptable logic circuitry 220 in another embodiment of the invention.

The ink jet image data processing functions 210 is performed using image data processing circuitry 260 and serial ink jet image data processing 250. The serial ink jet image data processing 250 is specifically dedicated to performing selected functions of the ink jet image data processing functions 210 that need not be performed using parallel ink jet image data processing. The ink jet image data processing functions 210 include several functions that must be performed on image data prior to printing using the digital image printer 200. Nozzle data shifting 211, nozzle data masking 212, nozzle dot counting 213, nozzle data mapping 214, and nozzle columns separation 215 are all ink jet image data processing functions 210 that must be performed prior to printing using the digital image printer 200. Any other nozzle function 216 is also performed with the other ink jet image data processing functions 210 without departing from the scope and spirit of the invention.

The flexible array adaptable logic circuitry 220 contains at least one internal bit ring register. A 4×52 bit ring register array 223 and a dual 1×104 bit ring register array 225 are contained within the flexible array adaptable logic circuitry 220. However, only one of either the 4×52 bit ring register array 223 or the dual 1×104 bit ring register array 225 is required to perform the invention. In one embodiment of the invention, the flexible array adaptable logic circuitry 220 are configured by the 4×52 bit ring register array 223 to perform the nozzle dot counting 213. In another embodiment of the invention, the flexible array adaptable logic circuitry 220 are configured by the dual 1×104 bit ring register array 225 to perform the nozzle data shifting 211, the nozzle data masking 212, and the nozzle dot counting 213. The flexible array adaptable logic circuitry 220 interfaces with a data pipeline 270 to perform the ink jet image data processing functions 210. The manner of performing the invention, by performing serial ink jet image data processing 250 and using the data pipeline 270, is intrinsically scaleable to digital image printers having various physical and mechanical characteristics. The desirable scaleability provided by the serial ink jet image data processing 250 allows the use of the same data pipeline 270 irrespective of the physical and mechanical characteristics of the digital image printer 200.

Figure 3:
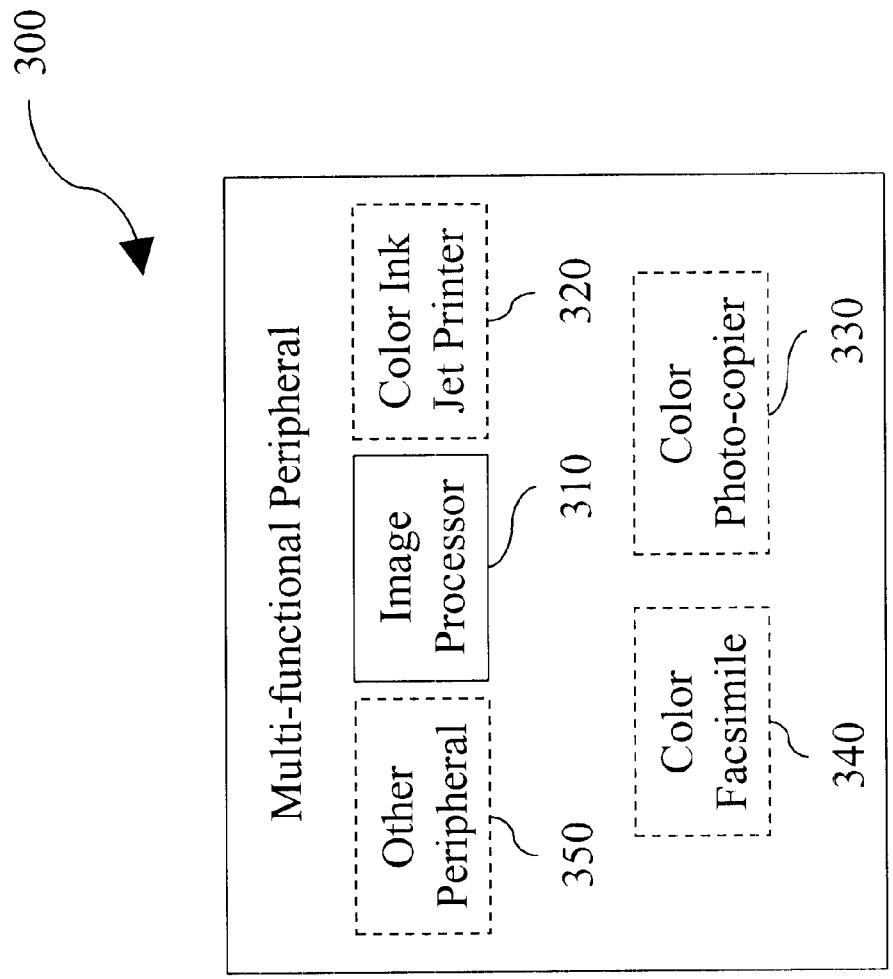
FIG. 3 is a multi-functional peripheral that contains an image processor illustrating one embodiment of the present invention.

FIG. 3 is a multi-functional peripheral 300 that contains an image processor 310 illustrating one embodiment of the present invention. In certain embodiments, additional peripheral devices are included in the multi-functional peripheral 300. The multi-functional peripheral 300 contains any number of devices that cooperatively perform processing using the image processor 310 to prepare image data in a form suitable for printing or display that is of a high visible perceptual quality. Examples of such devices include color photo-copy machines, color facsimiles, color printers, black and white printers, and digital printers.

In certain embodiments of the invention, the multi-functional peripheral 300 contains several of the devices described above. In certain embodiments of the present invention, a color ink jet printer 320 is included in the multi-functional peripheral 300. In other embodiments, a color photo-copier 330 and a color facsimile 340 are both contained in the multi-functional peripheral 300 thereby providing multiple functions all within a single device. Those having skill in the art will recognize that any other peripheral 350 could be similarly included in the multi-functional peripheral 300 without departing from the scope and spirit of the invention. In certain embodiments, the multi-functional peripheral 300 provides a system in which various devices serve one another in receiving data in one form and converting it into another for appropriate display, reproduction, or transmission. In certain embodiments, the color photocopier 330 converts a plurality of image data 710 to a plurality of image data for display/print 730 that is suitable for display or printing (See FIG. 7). The plurality of image data 710 is then input into the color facsimile 340 wherein it is viewed or reproduced as the plurality of image data 730. The color facsimile 340 performs converts the plurality of image data 710 to a form suitable for transmission on the communication link 290 (See FIG. 2). Those having skill in the art will recognize that the image data addressing system 100, as described in FIG. 1, is contained within the multi-functional peripheral 300 in many of the various embodiments of the invention.

Figure 4:
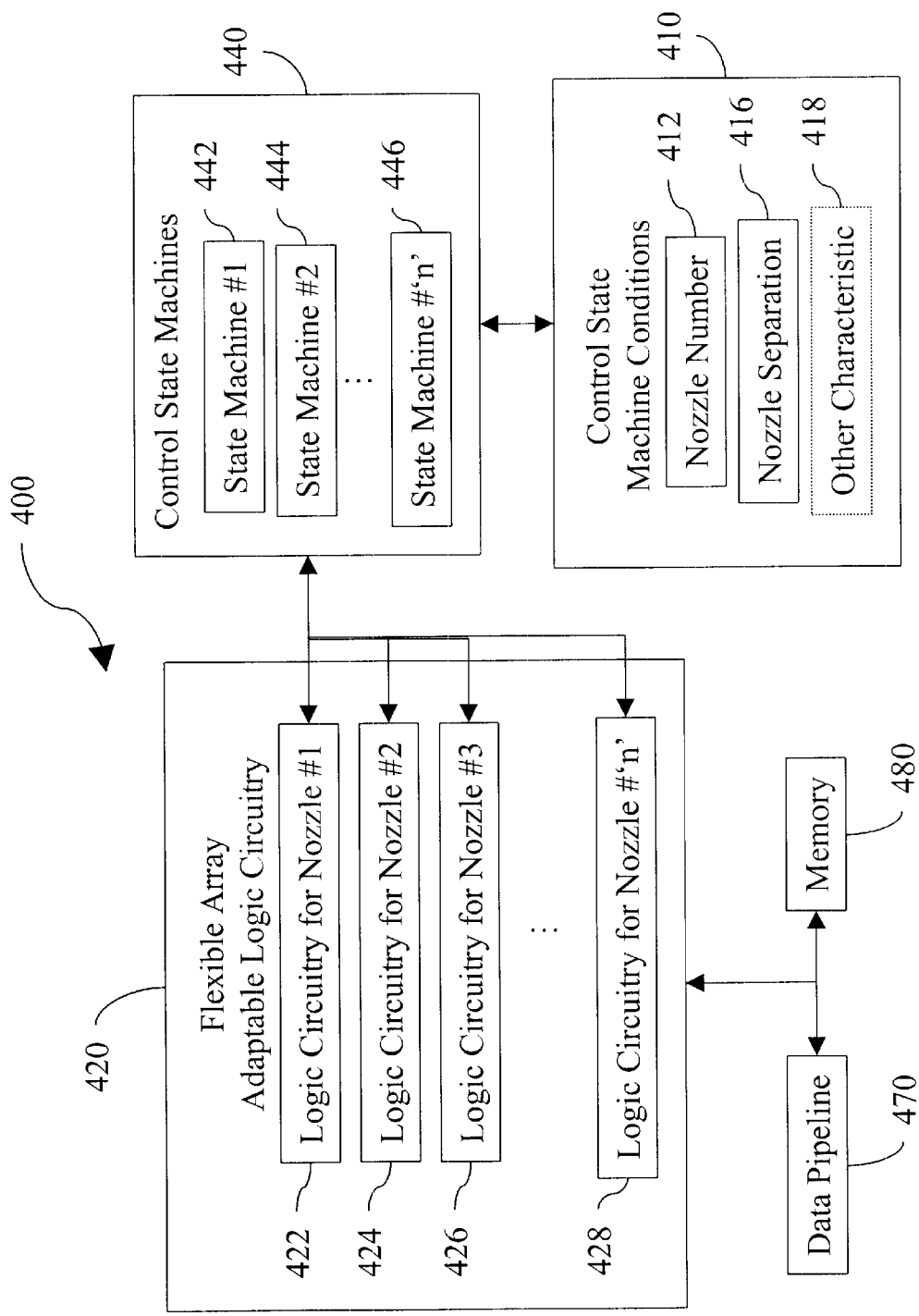
FIG. 4 is a programmable image data processing system illustrating a specific embodiment of any one or more of FIG. 1, 2 or 3.

FIG. 4 is a programmable image data processing system 400 illustrating a specific embodiment of any one or more of FIG. 1, 2 or 3. Flexible array adaptable logic circuitry 420 is configured by a plurality of control state machines 440. The plurality of control state machines 440 receive control state machine conditions 410 that determine the particular configuration required for the flexible array adaptable logic circuitry 420. The plurality of control state machines 440 reconfigure the flexible array adaptable logic circuitry 420. The plurality of control state machines 410 contains several state machines, namely, a state machine #1 442, a state machine #2 444, and a state machine #'n' 446. Any one of the plurality of control state machines 440 dominates and controls the entirety of the configuration of the flexible array adaptable logic circuitry 420 in one embodiment of the invention. Alternatively, several of the plurality of control state machines 440 operate cooperatively to configure the flexible array adaptable logic circuitry 420 in another embodiment of the invention.

The flexible array adaptable logic circuitry 420 contains multiple internal logic circuitry, namely, logic circuitry for nozzle #1 422, logic circuitry for nozzle #2 424, logic circuitry for nozzle #3 426, and logic circuitry for nozzle #'n' 428. The logic circuitry for nozzle #1 422 corresponds to logic operable for a digital image printer having one particular number of ink jet nozzles; the logic circuitry for nozzle #2 424 corresponds to logic operable for a digital image printer having another particular number of ink jet nozzles. The plurality of control state machines 440 enables at least one of the flexible array adaptable logic circuitry 420 to perform image data processing. In certain embodiments of the invention, the plurality of control state machines 440 enables a particular combination of the flexible array adaptable logic circuitry 420 to perform image data processing. Multiple predetermined combinations of the flexible array adaptable logic circuitry 420 are used to perform digital image data processing in other embodiment of the invention. A data pipeline 470 and a memory 480 are used by the flexible array adaptable logic circuitry 420 to perform image data processing.

The control state machine conditions 410 are determined by any one of a number of printer components specific to the digital image printer. Specific examples of control state machine conditions 410 include a nozzle number 412 and a nozzle separation 416. Any other characteristic 418 corresponding to a printer component specific to the digital image printer may be used to govern the control state machine conditions 410.

Figure 5:
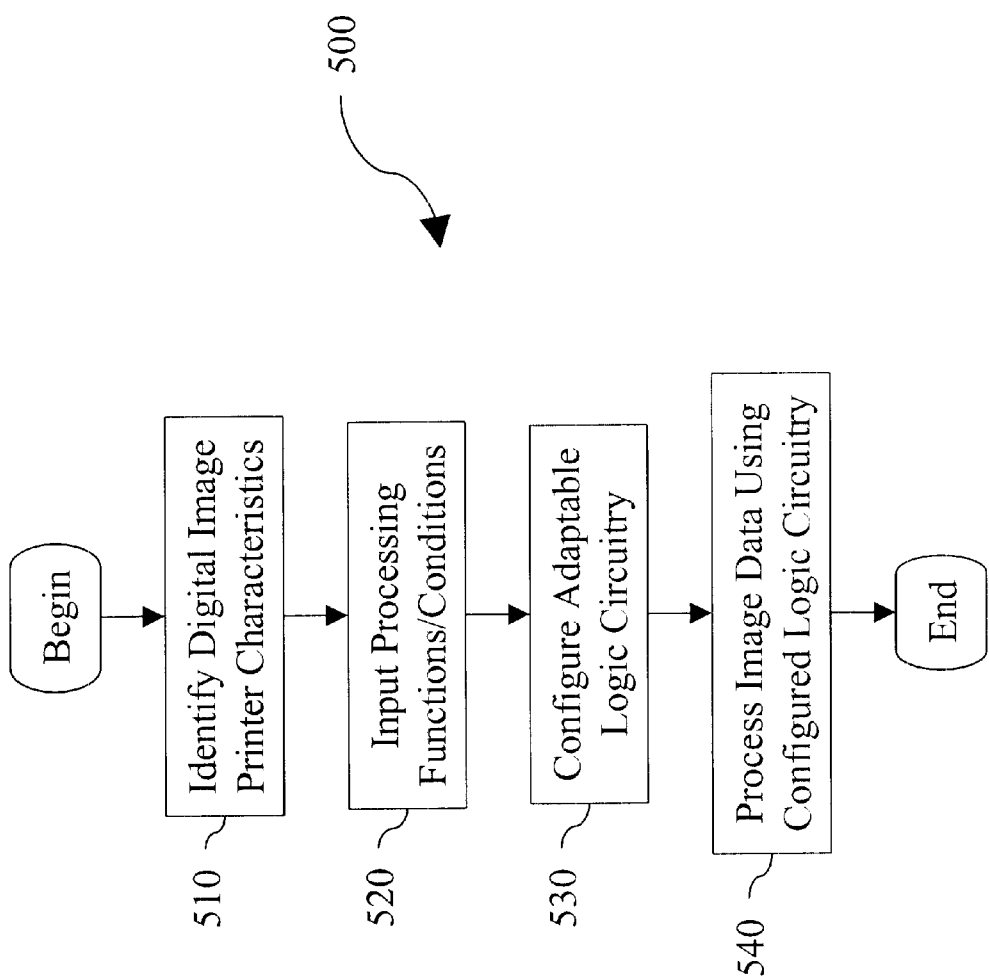
FIG. 5 is a functional block diagram illustrating another embodiment of the present invention that performs programmable image data processing.

FIG. 5 is a functional block diagram 500 illustrating another embodiment of the present invention that performs programmable image data processing. In a block 510, the digital image printer characteristics are identified. These characteristics correspond to a variety of physical and mechanical characteristics of the digital image printer including, among other things, the number of ink jet printer nozzles, the ink jet nozzle separation, the firing order of the ink jet nozzles, and other characteristics of the digital image printer including electrical processing circuitry characteristics of the digital image printer. In a block 520, processing function/conditions are input to the digital image printer. These processing function/conditions of the block 520 are used to configure adaptable logic circuitry in a block 530. Once the adaptable logic circuitry has been configured in the block 530, the digital image data is processed using the configured logic circuitry in a block 540.

Figure 6:
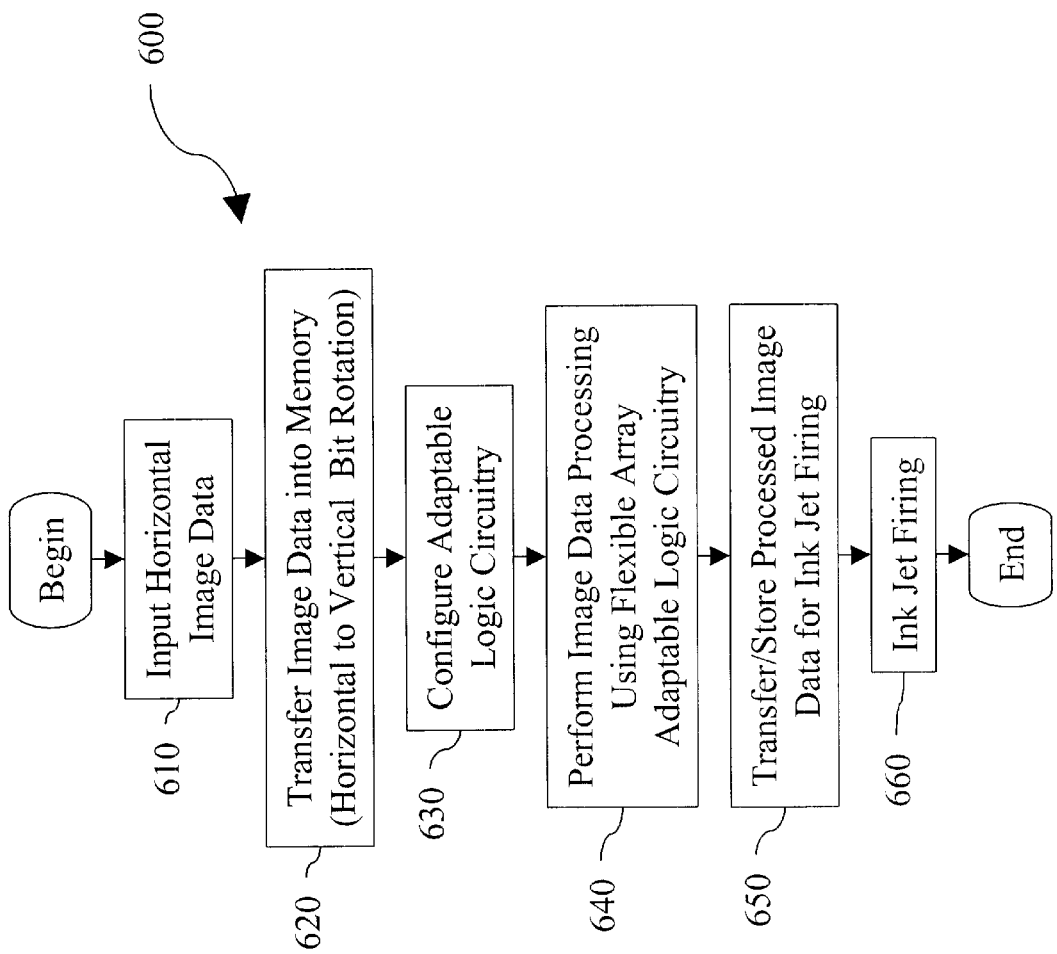
FIG. 6 is a functional block diagram illustrating a specific embodiment of the functional block diagram of FIG. 5.

FIG. 6 is a functional block diagram 600 illustrating a specific embodiment of the functional block diagram of FIG. 5. In a block 610, digital image data having a horizontal format is input into a digital image printer. In a block 620, the digital image data are transferred into memory wherein bit rotation is performed and the digital image data then possess a vertical format in preparation for printing. In a block 630, adaptable logic circuitry is configured in preparation to perform image data processing on the digital image data in a block 640 using flexible array adaptable logic circuitry. Once the image data processing is completed in the block 640, the processed image data is transferred or stored in a memory or data register in a block 650 prior to ink jet firing in a block 660.

Figure 7:
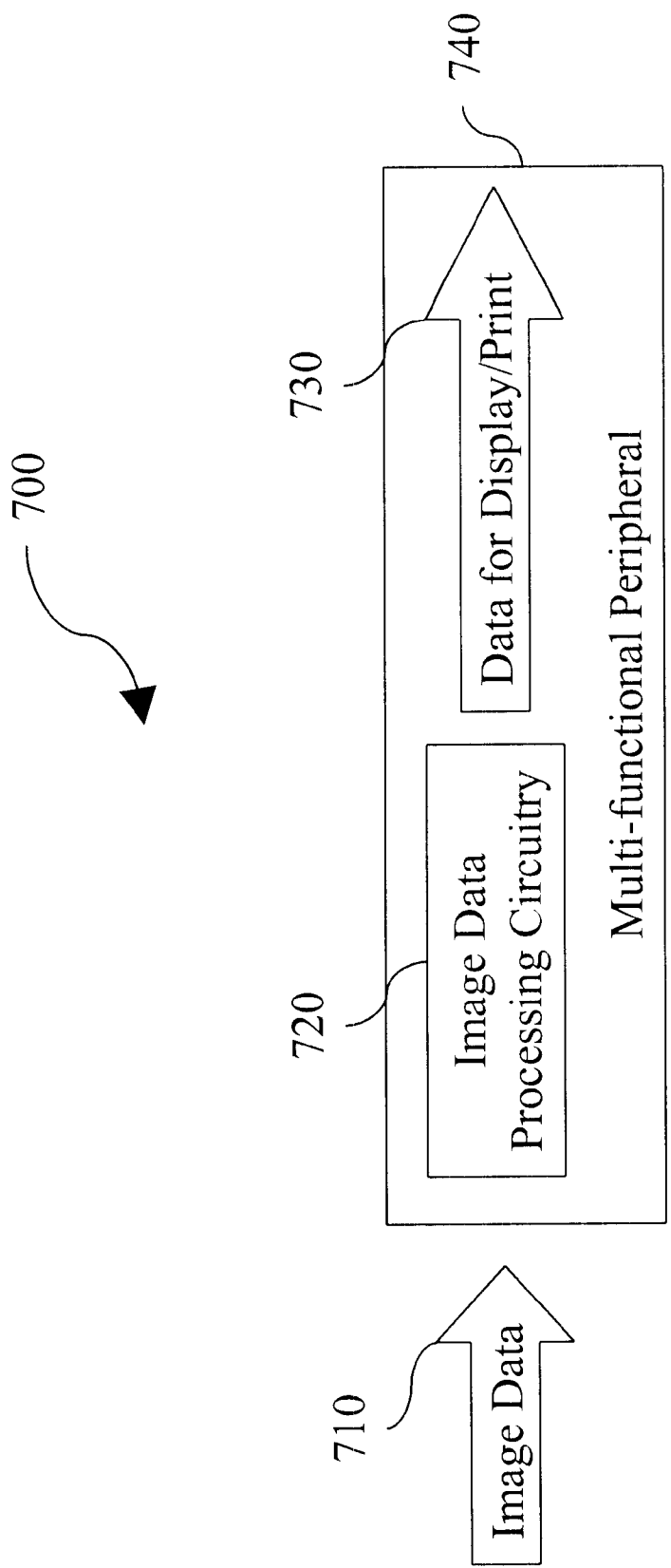
FIG. 7 is a multi-functional peripheral illustrating one specific embodiment of the present invention that performs image processing to make a plurality of image data suitable for displaying or printing.

FIG. 7 is a multi-functional peripheral 740 illustrating one specific embodiment 700 of the present invention that performs image processing to make a plurality of image data 710 suitable for displaying or printing, i.e., into a plurality of image data for display/print 730. In certain embodiments of the invention, the multi-functional peripheral 740 is the multi-functional peripheral 300 as described in FIG. 3. The multi-functional peripheral 740 contains image data processing circuitry 720 that is used to process a plurality of image data 710. The multi-functional peripheral 740 converts the plurality of image data 710 into the plurality image data for display/print 730. The plurality image data for display/print 730 is in a form suitable for printing on color ink jet printers in certain embodiments of the invention. In other embodiments, it is in a form suitable for laser printers. In certain embodiments of the invention, the processing circuitry 720 is the image processor 310 as described in FIG. 3. In other embodiments, it is internal processing resources contained within any of the devices contained within the multi-functional peripheral 300 of FIG. 3 including the other peripheral 350.

Figure 8:
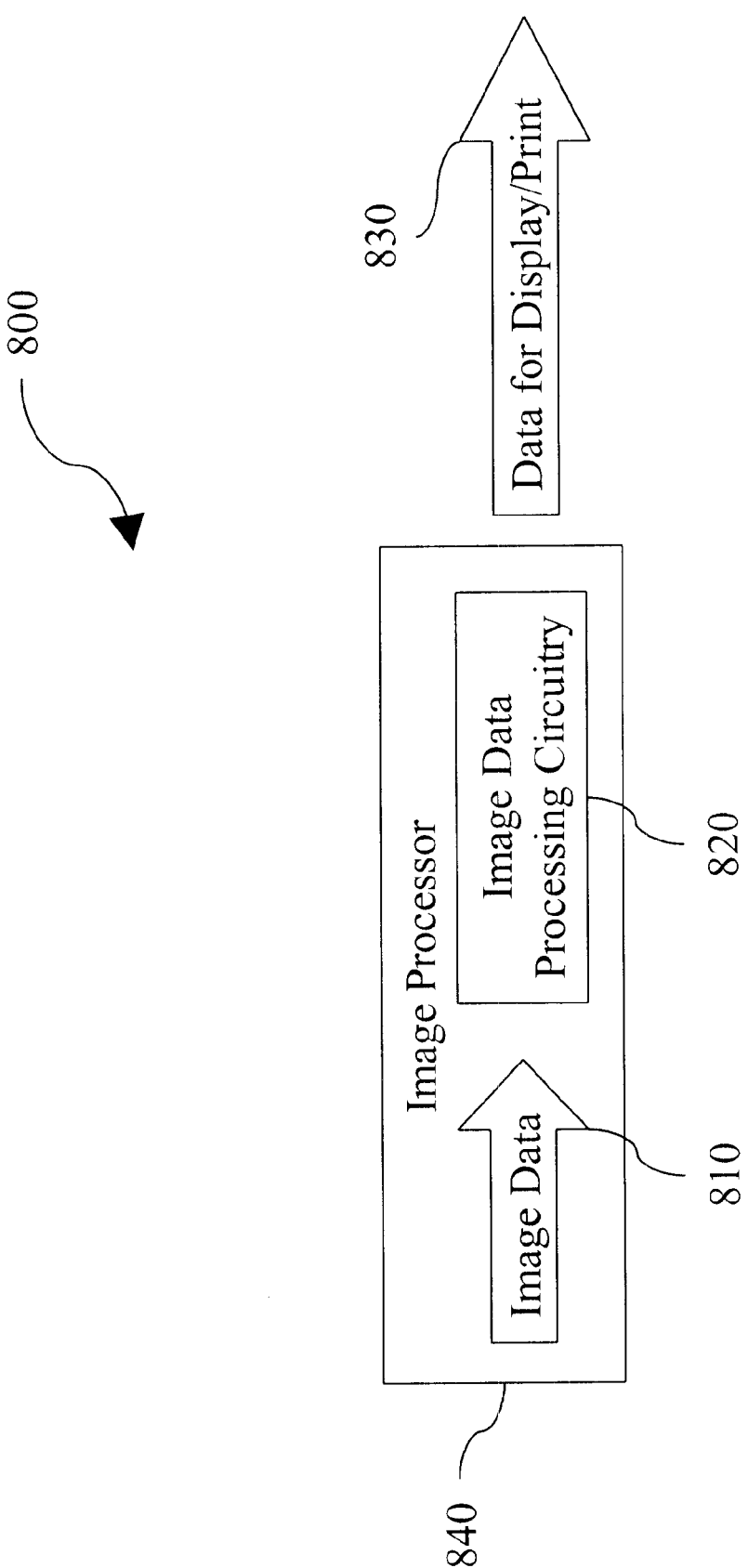
FIG. 8 is an image processor illustrating one specific embodiment of the present invention that performs image processing to make a plurality of image data suitable for displaying or printing.

FIG. 8 is an image processor 840 illustrating one specific embodiment 800 of the present invention that performs image processing to make a plurality of image data 810 suitable for displaying or printing, i.e., into a plurality of image data for display/print 830. The image processor 840 contains image data processing circuitry 820. In certain embodiments, the image processor 840 is substantially the same as the image processor 310 as described in the multi-functional peripheral 300 of FIG. 3. The image data processing circuitry 820 is used to process the plurality of image data 810 into the plurality of image data for display/print 830. In certain embodiments of the invention, the image processor 840 is a processing system internal to any of the devices contained within the multi-functional peripheral 300 of FIG. 3 including the other peripheral 350.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. A printer that prints digital image data, the printer having a printer component selected from a plurality of types of printer components, the printer comprising:

a plurality of image processing logic that are capable of supporting the plurality of types of printer components;

a processing circuit that only uses that portion of the plurality of image processing logic that corresponds to the printer component selected from the plurality of types of printer components; and wherein the plurality of image processing logic comprises at least one bit ring register having a predetermined number of bits.

2. The printer of claim 1, wherein the processing circuit selects the portion of the plurality of image processing logic.

3. The printer of claim 2, wherein the selection comprises automatic selection.

4. The printer of claim 3, wherein the automatic selection is performed based on the type of printer component selected.

5. The printer of claim 1, wherein the processing circuit comprises at least one control state machine.

6. The printer of claim 5, wherein the at least one control state machine uses at least one control state condition in using that portion of the plurality of image processing logic that corresponds to the printer component selected from the plurality of types of printer components.

7. The printer of claim 1, wherein the printer component is a number of ink jet nozzles.

8. The printer of claim 1, wherein the printer is contained within a peripheral device.

9. The printer of claim 1, wherein the printer is contained within a stand alone device.

10. A printer having a printer component selected from a plurality of types of printer components that prints digital image data, the printer comprising:

a plurality of image processing logic;

a processing circuit that only uses a subset of at least one of the plurality of image processing logic; and wherein the plurality of image processing logic comprises at least one bit ring register having a predetermined number of bits.

11. The printer of claim 10, wherein the processing circuit selects the portion of the plurality of image processing logic.

12. The printer of claim 11, wherein the selection comprises automatic selection.

13. The printer of claim 12, wherein the automatic selection is performed based on the type of printer component selected.

14. The printer of claim 10, wherein the bit ring register is a 4×52 bit ring register.

15. The printer of claim 10, wherein the printer is contained within a stand alone device.

16. A printer having a printer component selected from a plurality of types of printer components that prints digital image data, the printer comprising:

a printer component selected from a plurality of types of printer components;

a plurality of image processing logic that supports the plurality of types of printer components;

a processing circuit that only uses that portion of the plurality of image processing logic that corresponds to the type of printer component selected; and wherein the plurality of image processing logic comprises at least one bit ring register having a predetermined number of bits.

17. The printer of claim 16, wherein the processing circuit selects the portion of the plurality of image processing logic.

18. The printer of claim 17, wherein the selection comprises automatic selection.

19. The printer of claim 18, wherein the automatic selection is performed based on the type of printer component selected.

20. The printer of claim 16, wherein the printer component is a number of ink jet nozzles.

* * * * *